(12) United States Patent
Kisla et al.

(10) Patent No.: US 11,632,014 B2
(45) Date of Patent: Apr. 18, 2023

(54) JOINT SHAFT

(71) Applicant: Off-Highway Powertrain Services Germany GmbH, Lohmar (DE)

(72) Inventors: Timur Mehmet Kisla, Troisdorf (DE); Max Krüger, Lohmar (DE)

(73) Assignee: Off-Highway Powertrain Services Germany GmbH, Lohmar (DE)

( * ) Notice: Subject to any disclaimer, the term of this patent is extended or adjusted under 35 U.S.C. 154(b) by 0 days.

(21) Appl. No.: 16/899,799

(22) Filed: Jun. 12, 2020

(65) Prior Publication Data

US 2020/0395814 A1 Dec. 17, 2020

(30) Foreign Application Priority Data

Jun. 14, 2019 (DE) ...................... 10 2019 208 713.2

(51) Int. Cl.
*H02K 7/00* (2006.01)
*H02K 7/18* (2006.01)

(52) U.S. Cl.
CPC ............. *H02K 7/003* (2013.01); *H02K 7/006* (2013.01); *H02K 7/1892* (2013.01)

(58) Field of Classification Search
CPC ....... H02K 7/1823; H02K 17/12; H02K 16/02
USPC ................. 310/68 B, 68 E, 102 R, 113, 67 A
See application file for complete search history.

(56) References Cited

U.S. PATENT DOCUMENTS

| | | | |
|---|---|---|---|
| 2,347,208 A * | 4/1944 | Martin | G01L 3/16 307/156 |
| 2,724,965 A * | 11/1955 | Crater | G01L 3/14 73/862.31 |
| 3,545,265 A * | 12/1970 | Kingsford-Smith | G01L 3/242 73/862.328 |
| 3,956,930 A | 5/1976 | Shoberg | |
| 4,838,077 A | 6/1989 | Shifflet et al. | |
| 5,224,563 A * | 7/1993 | Iizuka | B60K 6/48 180/65.21 |
| 5,718,633 A | 2/1998 | Gehrke | |
| 6,670,890 B2 | 12/2003 | Kyrtsos et al. | |
| 6,813,973 B1 * | 11/2004 | Perry | F16C 3/02 464/180 |
| 7,513,159 B2 | 4/2009 | Komeyama et al. | |
| 7,603,918 B2 * | 10/2009 | Blackwood | G01L 5/136 73/862.23 |
| 8,166,810 B2 | 5/2012 | Chen et al. | |
| 9,132,838 B2 | 9/2015 | Baker | |

(Continued)

FOREIGN PATENT DOCUMENTS

| | | | | |
|---|---|---|---|---|
| CN | 203257535 U | * | 10/2013 | |
| CN | 104769818 A | * | 7/2015 | ............... F16M 1/04 |

(Continued)

OTHER PUBLICATIONS

Wagner et al., "Cardan or Hooke Universal Joint", Universal Joint and Driveshaft Design Manual, 1979, pp. 39-75.

*Primary Examiner* — Jose A Gonzalez Quinones
(74) *Attorney, Agent, or Firm* — The Webb Law Firm

(57) ABSTRACT

A joint shaft includes at least one cross pin, the at least one cross pin including oppositely disposed pins on each of which a shaft member is attached; and a generator attached to at least one of the shaft members. The joint shaft may further include a sensor energized by the generator and attached to the joint shaft and/or a logic configured to evaluate an electrical output of the generator.

15 Claims, 7 Drawing Sheets

(56) References Cited

U.S. PATENT DOCUMENTS

| | | | |
|---|---|---|---|
| 9,667,116 | B2 | 5/2017 | Fujimoto et al. |
| 10,288,124 | B2 | 5/2019 | Munk |
| 2001/0033234 | A1 | 10/2001 | Kyrtsos et al. |
| 2008/0078253 | A1 | 4/2008 | Blackwood et al. |
| 2010/0151949 | A1* | 6/2010 | Creek .................. B60L 3/0069 464/70 |
| 2011/0150654 | A1* | 6/2011 | Wei ........................ F03D 80/70 290/55 |
| 2014/0062423 | A1* | 3/2014 | Delhsen ................ H02K 7/025 322/4 |
| 2014/0188353 | A1* | 7/2014 | Baker ................... B60W 40/13 701/53 |
| 2020/0018667 | A1 | 1/2020 | Hansen |
| 2020/0263738 | A1 | 8/2020 | Kisla et al. |
| 2022/0012960 | A1 | 1/2022 | Muttige et al. |

FOREIGN PATENT DOCUMENTS

| | | |
|---|---|---|
| CN | 106050957 A | 10/2016 |
| DE | 1675809 B1 | 10/1969 |
| DE | 10160760 A1 | 6/2003 |
| DE | 102013212052 A1 | 1/2015 |
| EP | 0338095 A1 | 10/1989 |
| EP | 1775492 A1 | 4/2007 |
| EP | 2175547 A2 | 4/2010 |
| EP | 2843359 A1 | 3/2015 |
| EP | 3599389 A1 | 1/2020 |
| WO | 9628665 A1 | 9/1996 |
| WO | 2008138369 A1 | 11/2008 |
| WO | WO-2014156674 A1 * 10/2014 ............. A01D 69/02 |

\* cited by examiner

JOINT SHAFT

CROSS-REFERENCE TO RELATED APPLICATION

This application claims priority to German Patent Application No. 10 2019 208 713.2 filed Jun. 14, 2019, the disclosure of which is hereby incorporated by reference in its entirety.

BACKGROUND OF THE INVENTION

The present invention lies in the field of drive technology.

Joint shafts are used when transmitting a torque in an articulated drive train. Sometimes these joint shafts are provided with additional length compensation, which is also referred to as a slide member.

Such joint shafts, which are to be improved with the present invention, are also used between tractors and agricultural machinery pulled, pushed or carried by former. Employed between the tractor and the machine is typically a joint shaft with two universal joints and an intermediate multi-part shaft which realizes a shaft tube as well as segments for length compensation in order to make the torque transmission independent of which motion the machines perform relative to the tractor or towing vehicle, respectively.

SUMMARY OF THE INVENTION

The present invention relates in particular to the improvement of such joint shafts.

According to an example of the present invention, a joint shaft is provided. The joint shaft comprises at least one cross pin, the at least one cross pin comprising oppositely disposed pins on each of which a shaft member is attached; and a generator attached to at least one of the shaft members.

The joint shaft may further comprise a sensor energized by the generator and attached to the joint shaft. The sensor may be attached to the cross pin of the joint shaft.

The joint shaft may further comprise a logic configured to evaluate an electrical output of the generator. The logic may be configured to evaluate a voltage generated by the generator in order to determine a cardan effect. The logic may be configured evaluate a voltage generated by the generator in order to determine an angular position between the two shaft members. The logic may be configured to evaluate the electrical output of the generator in order to detect malfunctions of the joint shaft and/or of the generator. The logic may be configured to evaluate the electrical output of the generator in order to determine an operating behavior of a turning shaft. The logic may be configured to determine a rotational speed of the turning shaft.

The generator may be arranged in one of the shaft members in a rotationally fixed manner.

The generator may be configured to energize a transmitter. The transmitter may be configured to send a measuring signal of a sensor connected to the joint shaft to an external logic and/or an evaluation signal generated by a logic of the joint shaft.

DETAILED DESCRIPTION OF THE INVENTION

Figure 1:
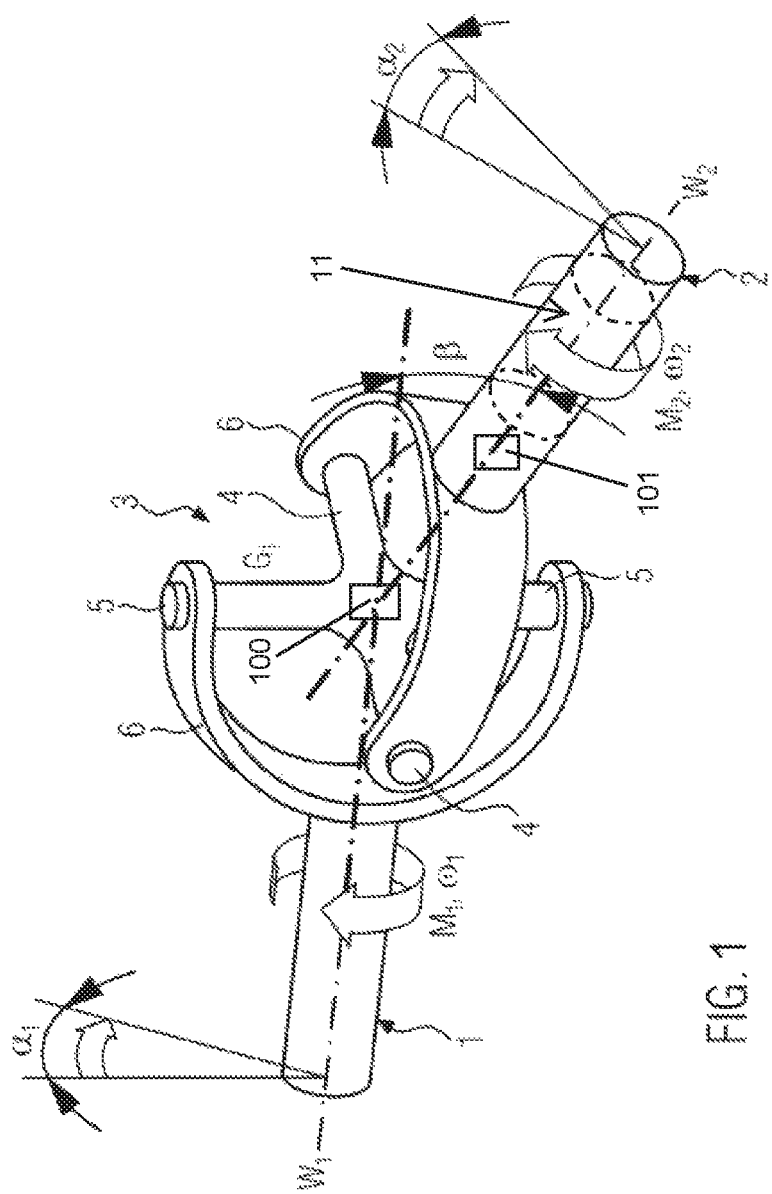
FIG. 1 is a perspective view of a conventional cardan joint.
Figure 8:
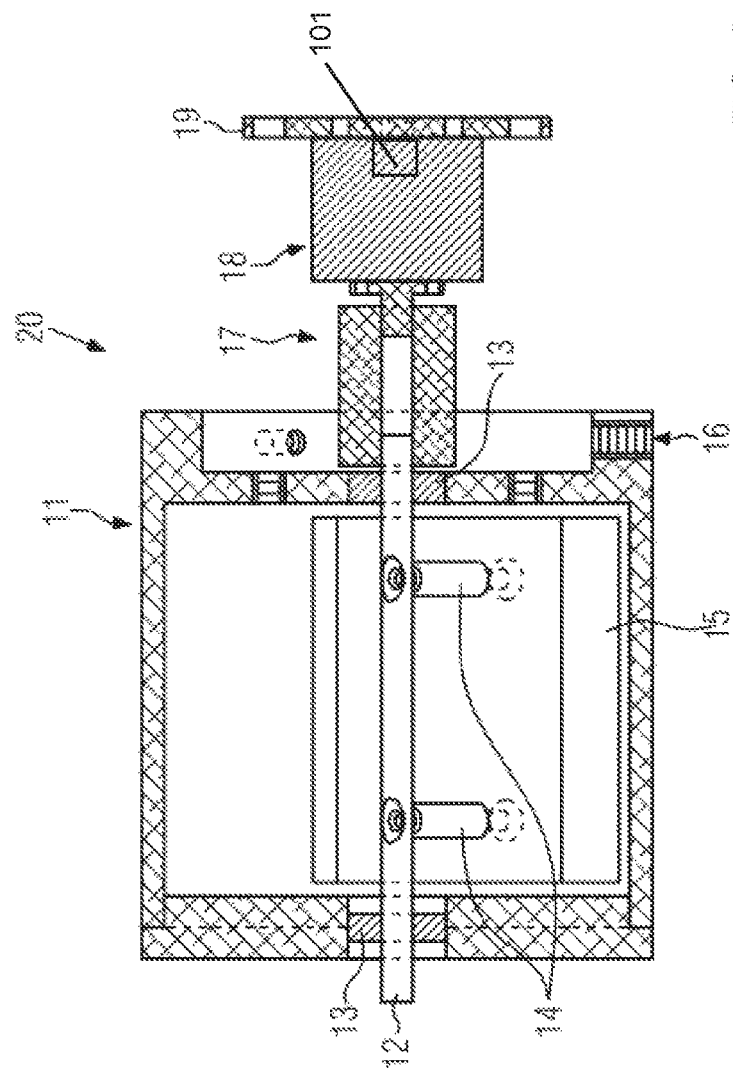
FIG. 8 is a cross-sectional view of a generator according to an example of the present disclosure.

According to the present invention and with reference to FIGS. 1 and 8, it is proposed to provide the joint shaft with a generator 20. This generator 20 generates electricity, typically for the power supply to the joint shaft itself. Because the latter is not just an element for transmitting a torque; the joint shaft can instead be equipped with at least one sensor 100 that detects the behavior of the joint shaft. This sensor 100 can be a temperature sensor, extensometer, acceleration sensor, or position sensor that monitors the thermal, dynamic, or mechanical load on the joint shaft. Such sensors are suitable for early detection of upcoming wear.

The generator 20 is arranged preferably in a rotationally fixed manner within one of the shaft members 1, 2 of the joint shaft which are attached to a cross pin 3 of the joint shaft. The cross pin 3 of a joint shaft typically has four pins 4, 5, each of which is arranged perpendicular relative to the others typically in one plane. A respective shaft member 1, 2 is attached in a rotationally fixed but articulated manner on oppositely disposed pins 4, 5. This makes it possible to transmit a torque between the two shaft members 1, 2 and at the same time to allow for a certain angular position of the two shaft members 1, 2 relative to each other. According to the previously discussed configuration, the shaft member 1, 2 accommodating the generator 20 comprises a tube member or is formed as a tube. Provided within this tube concentrically relative to the central longitudinal axis of the tube member is the generator 20. This generator comprises, for example, a shaft 12 that carries a mass 15 on an arm 14. The mass 15 should be arranged as far away as possible from the center longitudinal axis of the shaft 12. For reasons of simple assembly, the generator 20 typically comprises a housing 11, shown schematically in FIG. 1, that carries the shaft 12 and accommodates the mass 15. The housing 11 has fastening elements for the arrangement of the generator 20 in the shaft member 1, 2. The housing 11 typically has bearings 13 for rotatably mounting the shaft 12 that is attached in a rotationally fixed manner to the arm 14 and the mass 15. These components of the generator 20 are also referred to hereafter as a rotary generator.

An alternating current generator 18 is connected to a free end of the shaft 12 of the rotary generator and converts the rotational energy or motion and/or the rotary oscillation of the shaft 12 into electrical energy. The alternating current generator 18 can be configured in a known manner. It can also be provided with a holding plate by which the alternating current generator 18 can be provided attached by itself in the shaft member 12 and in rotationally fixed manner to the latter. Both the rotary generator and the alternating current generator 18 are then firmly attached to the shaft member 12. The mass 15 alone is able to rotate relative to the rotational motion of the shaft member 12. It follows the gravity field of the earth. This generates the torque which is converted into an alternating current in the alternating current generator 18.

This alternating current can be used to energize a transmitter 102 provided on the joint shaft and via which signals are sent to a receiver provided in the vicinity of the joint shaft. These signals may be the measurement signal of a sensor 100 connected to the joint shaft, preferably arranged on the cross pin 3. The transmitter 102 can also wirelessly transmit an evaluation signal of a logic 101 which is typically provided in the region of the generator 20. Although the rotary generator and the alternating current generator 18 with their respective components was geared toward above, the term "generator" in the sense of the present invention is understood to be a unit composed of both components. The generator 20 according to the present invention uses the rotation of at least one shaft member 1, 2 of the joint shaft to generate a torque, typically due to the mass 15 mounted rotatable and eccentric to the shaft 12, that drives the alternating current generator 18 for generating alternating current.

As mentioned earlier, the generator 20 can energize a sensor 100 that is part of the joint shaft. In addition, the generator 20 can energize a logic 101 that is either connected to the sensor 100 or also coupled in a data-related manner to the generator, specifically to the alternating current generator, for evaluating the electrical output of the generator. It can be determined at which velocity the joint shaft is operated, for example, by comparing the value of the electrical output to an evaluation table. The energy generated by the generator 20 in the form of amplitude and frequency can be used to analyze the rotational motion of the joint shaft, regardless of the individual configuration of the generator 20. The operating behavior of the joint shaft can also be analyzed by analyzing the electrical output. An operating behavior as planned can be analyzed, for example, to determine the rotational speed or angle of articulation of the joint shaft. Faults in the operating behavior can also be analyzed, such as misalignment or faulty operation of the joint shaft. It is also possible to use the energy generated by the generator to draw a conclusion about the cardan effect and then about a non-uniform angle of articulation at both ends of the joint shaft and to thus detect misalignment of these ends.

However, the logic 101 can further also be used to evaluate the cardan effect of the joint shaft or the angular position between the two shaft members and/or to determine emerging malfunctions of the joint shaft.

The invention is not restricted to a generator 20 according to the above configuration. Any type of generator is possible for the realization of the present invention. Generators that gain electrical power from a rotational motion of a shaft, such as a vehicle shaft, are commonly known. Reference is made to EP 2 175 547 A2. The generator according to the present invention, however, is typically such a generator which is functional by itself and solely by the arrangement in or on the joint shaft. This means that no functional elements of the generator are commonly provided that are not realized together with the joint shaft and/or do not rotate together with the joint shaft when it is in operation.

Preferably, the generator 20 feeds current to a transmitter 102 which transmits the measurement signal generated by the sensor 100 wirelessly to an externally provided logic or sends an evaluation signal generated by the logic 101 based on the sensor signal to a receiver. The transmitter 102 allows the wireless transmission of the measurement signal or the analyzed measurement signal for further processing of the respective signal. The signal transmitted can be displayed outside the actual joint shaft, for example, at a control station of a device comprising the joint shaft, for example, an agricultural towing vehicle. This makes it possible to analyze and, if necessary, correct a faulty setting of the joint shaft. Unequal angles of articulation at both ends of the joint shaft, which can lead to excessive stress on the joint shaft during operation, can be corrected by adjusting the position of the two drive elements provided at both ends of the joint shaft. For example, with respect to a gentle operating behavior of the joint shaft, an agricultural device driven by the joint shaft can be aligned in an optimized manner relative to the agricultural towing vehicle whose power take-off shaft can be attached to the joint shaft. But other uses are also conceivable. For stationary operation, the measuring signal or the evaluation signal can signal upcoming wear of the joint shaft and thus indicate necessary maintenance work.

The evaluation of the electrical output of the generator 20 for determining the angular position between the shaft members 1, 2 shall be explained in more detail below. A generator with four pairs of terminals and three phases is assumed. The following description refers in particular to FIG. 1 which schematically shows a conventional cardan joint and its essential parts. Where reference numeral 1 represents a first shaft member which is to be regarded as a joint shaft, and reference numeral 2 a second shaft member which is to be understood as being an output shaft. Disposed between the two shafts 1, 2 is a cross pin 3 which comprises oppositely disposed pins 4, 5 which are each attached via forks 6 to the corresponding shafts 1, 2.

α1 and α2 are the angles of rotation between the respective shafts 1, 2. B is the angle of articulation between the two shafts 1,2. Accordingly, angle β indicates the angular position of the two shafts 1, 2.

In the drawing, the torques of the respective shafts 1.2 are indicated y $M_1$ and $M_2$. The same applies to the angular velocities $\omega_1$, $\omega_2$.

The velocity ratio between the two shaft members arises from:

$$\frac{\omega_2}{\omega_1} = \frac{\cos\beta}{1 - \sin^2\beta \cdot \sin^2\alpha_1} \quad (1)$$

This velocity ratio affects the generator voltage induced. The sinusoidal voltage of the generator is superimposed by a further frequency which allows conclusions to be drawn about the angle of articulation β.

The different frequencies are to be analyzed for the evaluation of the output of the generator. The generator voltage and the cardan effect are preferably considered for the evaluation in the logic.

The following signals are of significance:

$$\text{generator voltage:} A_{generator}(t) = 1 \cdot \sin(2\pi \cdot 4 \cdot 5 \text{ Hz} \cdot t) \quad (2)$$

$$\text{gimbal error}^{24}: f_{cardan\ effect}(t) = 1 - 0.1 \cdot \sin(2\pi \cdot 2 \cdot 5 \text{ Hz} \cdot t) \quad (3)$$

$$(1)\cdot(2)\!:\!A_{module\ axes}(t)=(1\cdot\sin(2\pi\cdot 4\cdot 5\ Hz\cdot t))\cdot(1-0{,}1\cdot\sin(2\pi\cdot 2\cdot 5\ Hz\cdot t)) \quad (4)$$

A simplified formula was used for the representation of the cardan effect while taking into account (2)*(3) a small angle approximation. The correct velocity ratio was previously presented under (1). For the modulation, the generator voltage and the cardan effect are multiplied by each other; Formula (4).

Figure 3:
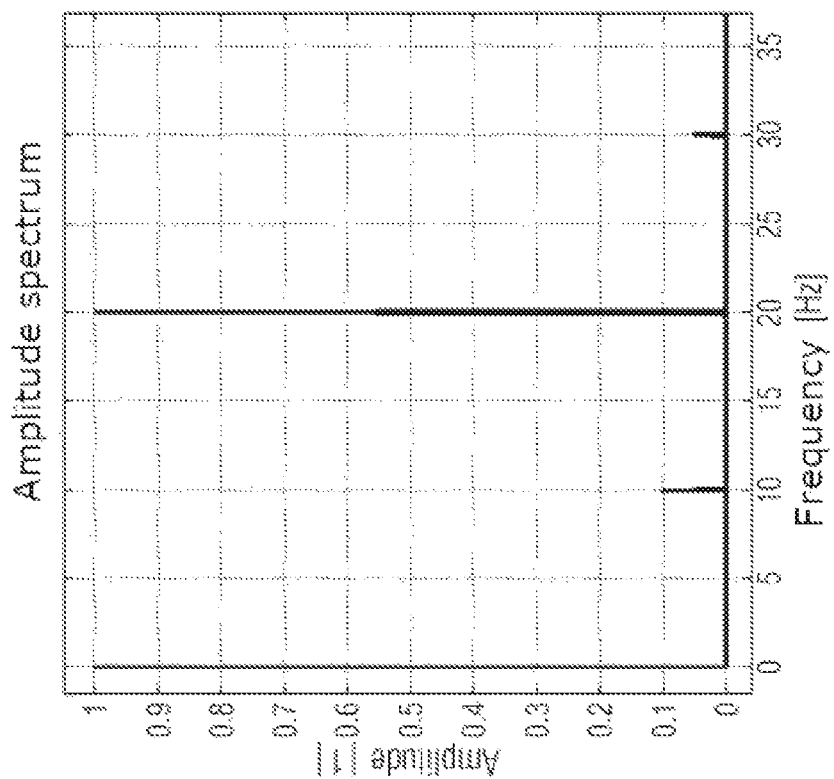
FIG. 3 is a chart illustrating amplitude spectrum for a generator of a joint shaft according to an example of the present invention.
Figure 2:
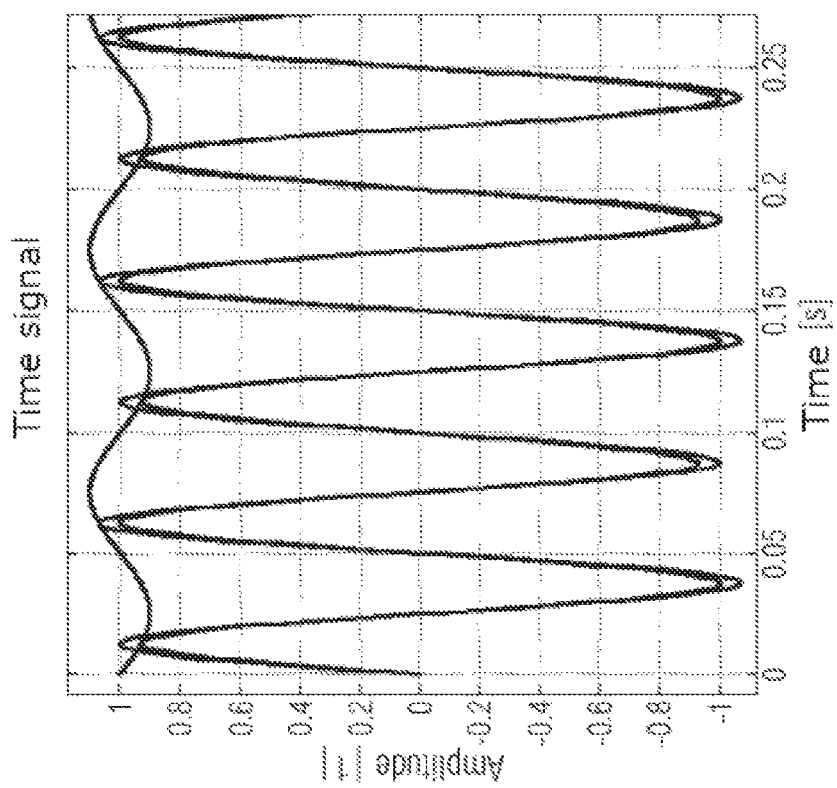
FIG. 2 is a chart illustrating generator voltage and cardan effect for a generator of a joint shaft according to an example of the present invention.

The generator voltage and the cardan effect are drawn in FIG. 2 as a solid line. The modulation is superimposed and, to the extent possible, rendered as a dotted line. FIG. 2 reflects an idealized course of the generator's voltage amplitude. The amplitude spectrum is illustrated in FIG. 3. It dominates the signal frequency of the generator of 20 Hz, due to a corresponding rotation of the joint shaft, which rotates at a rotational frequency of 5 Hz. The cardan effect occurs at twice the rotational frequency, i.e. from 10 Hz.

Figure 4:
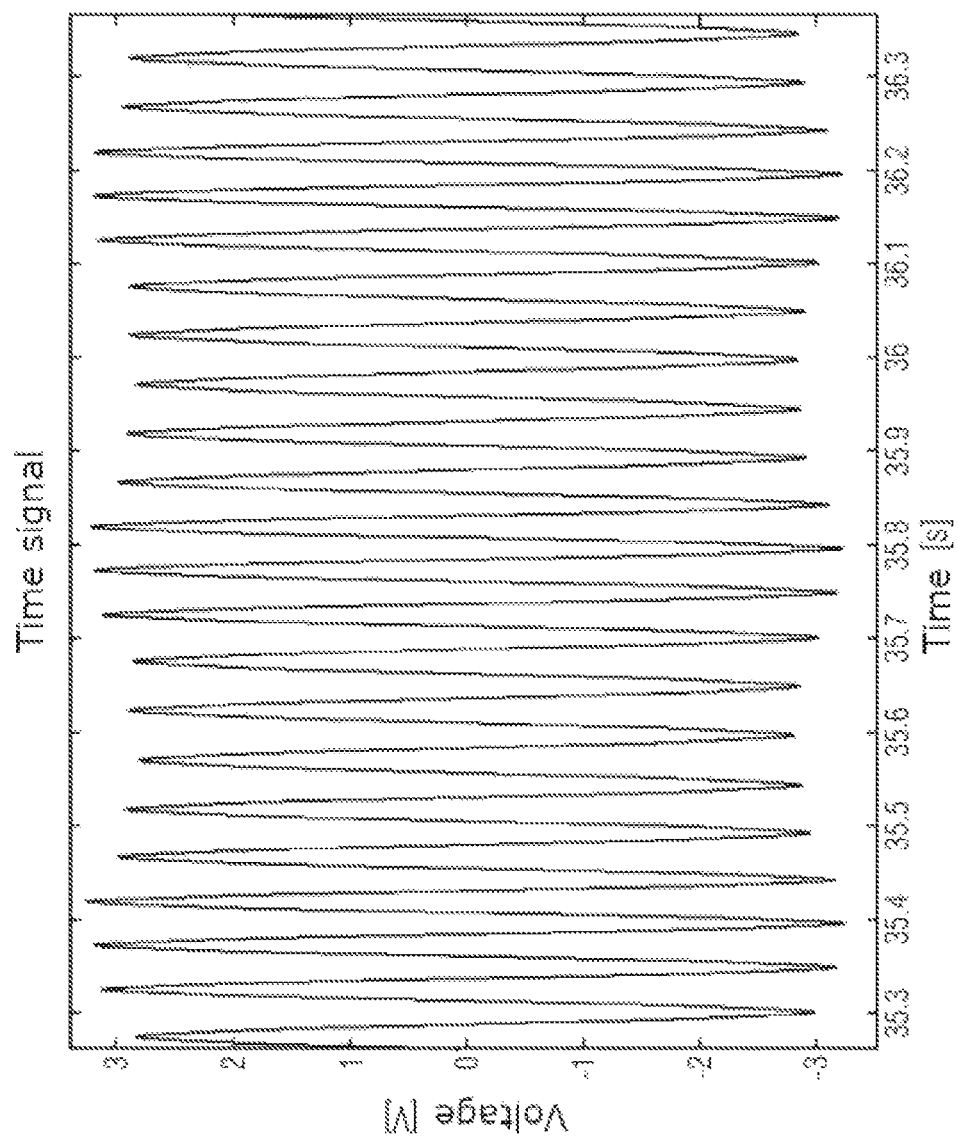
FIG. 4 is a chart illustrating an alternating voltage at a rotational frequency for a generator of a joint shaft according to an example of the present invention.
Figure 5:
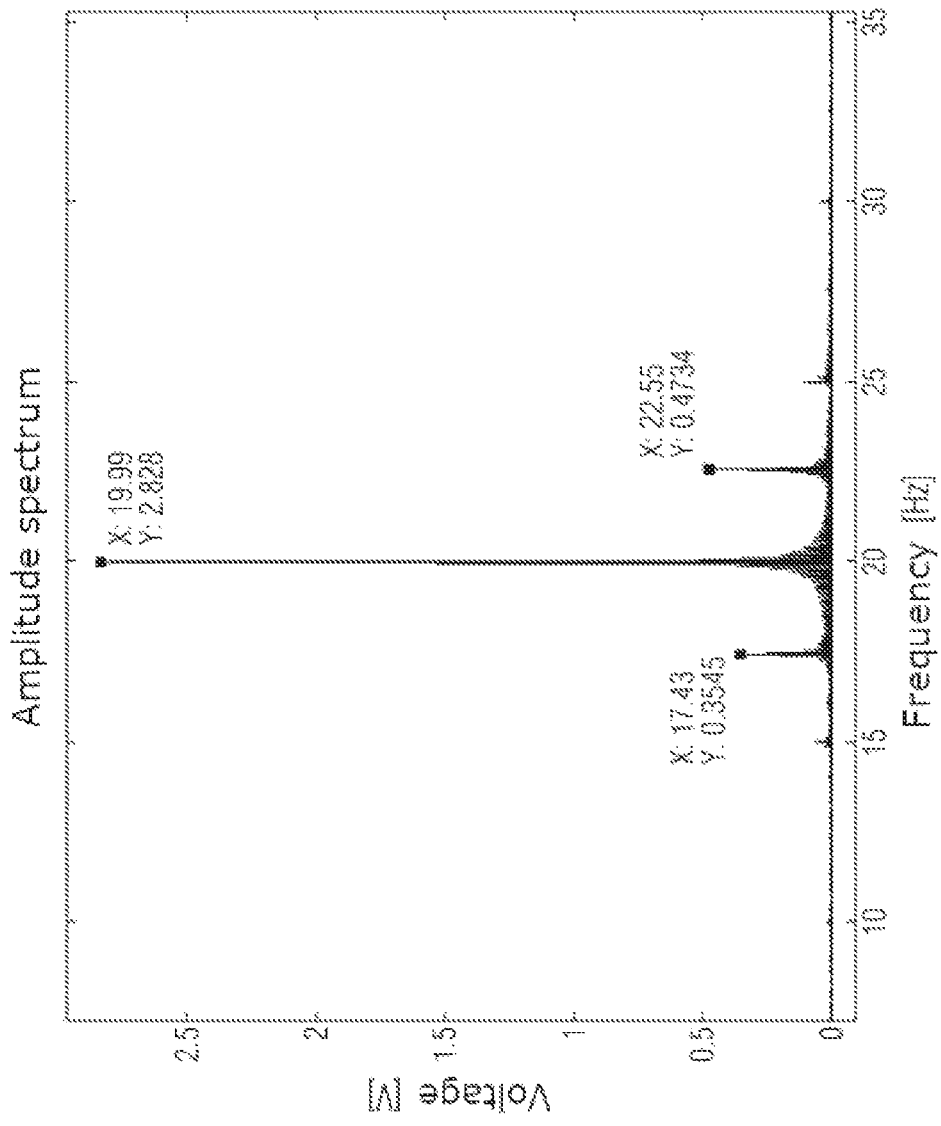
FIG. 5 is a chart illustrating amplitude spectrum determined by way of FFT for a generator of a joint shaft according to an example of the present invention.

FIG. 4 shows the alternating voltage at a rotational frequency of the joint shaft of 5 Hz at an angle of articulation β of 15°. The measurement signal shown in FIG. 4 is overlaid by the cardan effect, which is clearly reflected in different amplitudes of the generator voltage in dependence of time. The amplitude spectrum determined by way of FFT is illustrated in FIG. 5. Here is well, due to the rotation of the joint shaft and the four terminals, a dominant signal frequency of 20 Hz arises with pronounced sidebands of +/−2.5 Hz at about 17.5 Hz and 22.5 Hz reflecting the cardan effect. The generator generates an amplitude and a frequency that can be used to evaluate the rotational speed and the cardan effect (which arises from the angle of articulation, a misalignment or faulty operation of the joint shaft).

Figure 6:
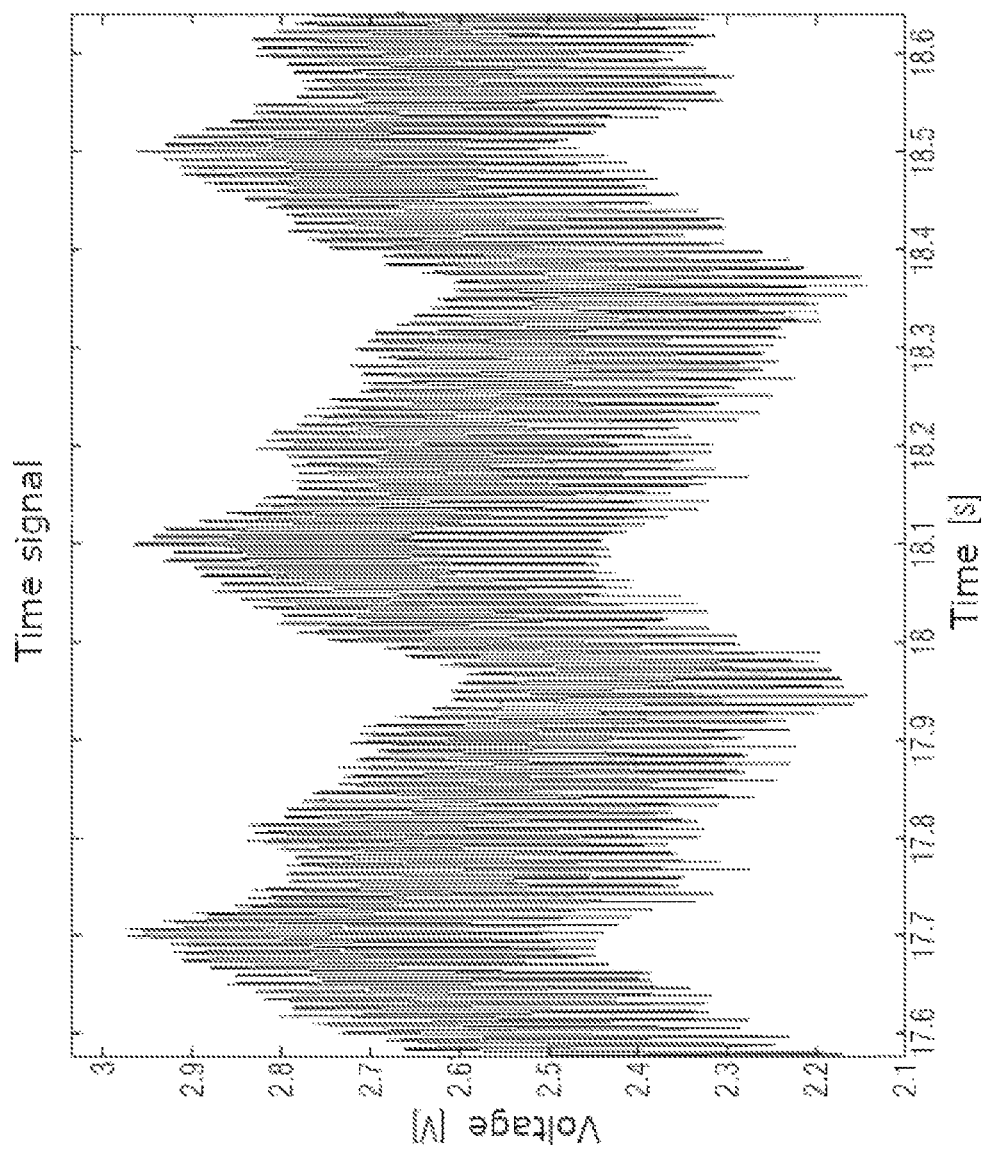
FIG. 6 is a chart illustrating a rectified time signal for a generator of a joint shaft according to an example of the present invention.
Figure 7:
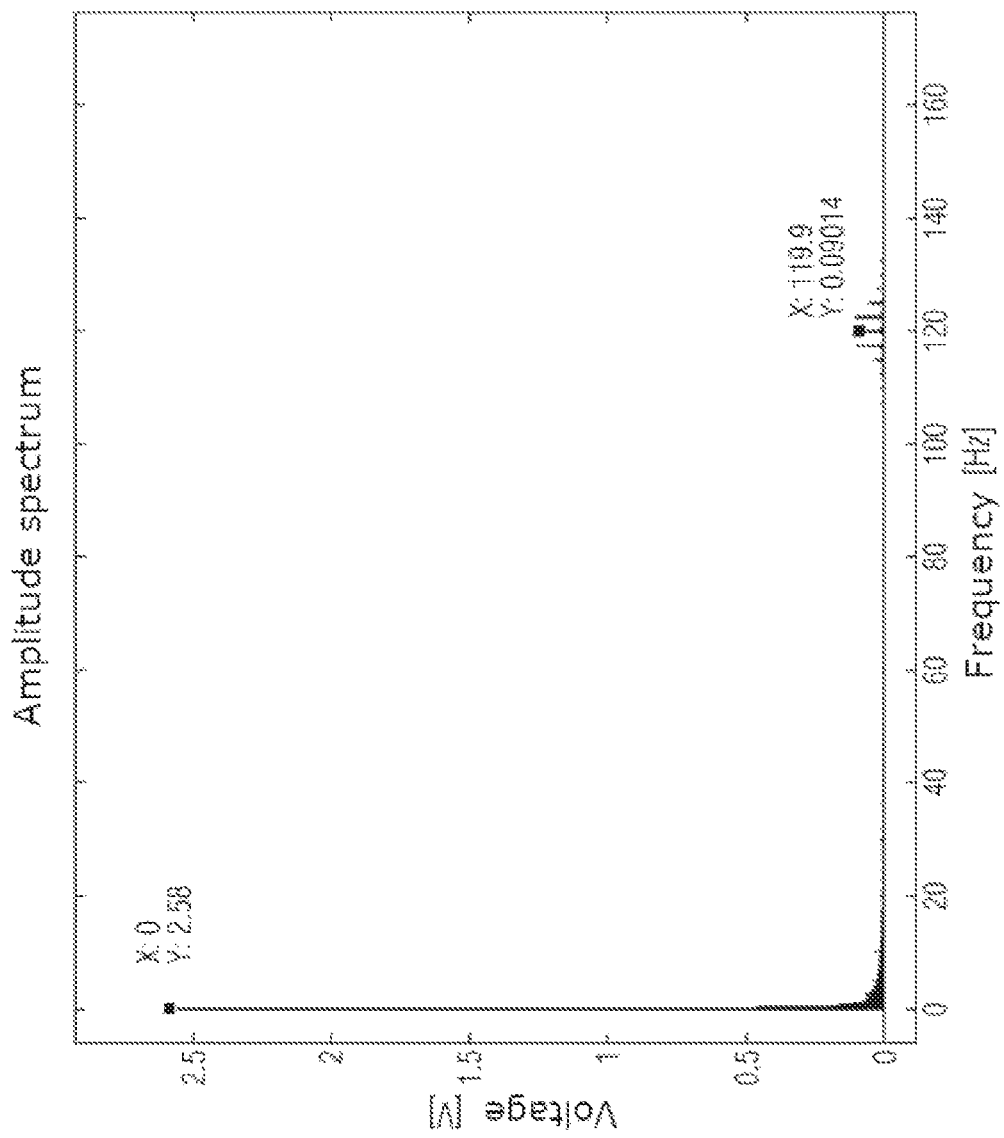
FIG. 7 is a chart illustrating a resulting amplitude spectrum after rectification for a generator of a joint shaft according to an example of the present invention.

To complete the illustration, the effect of the cardan effect after rectification of the alternating voltage is illustrated on the basis of FIGS. 6 and 7. FIG. 6 shows the rectified time signal at a rotational frequency of 5 Hz and an angle of articulation of 15°. With a uniform rotational motion, a symmetric alternating voltage would be expected. The distortion of symmetry due to the gimbal effect becomes clear in FIG. 6.

For the analysis of the amplitude spectrum according to FIG. 6, a time cutout of 20 seconds was considered in isolation for the same measurement parameters, as before. The resulting amplitude spectrum is illustrated in FIG. 7.

At 0 Hz, the dominant amplitude arises according to the direct voltage portion from the voltage signal according to FIG. 6. In addition, at a frequency of 120 Hz, a low residual oscillation arises due to the superimposed gimbal effect. The frequency of 120 Hz there arises by the rotational frequency of 5 Hz, the terminal number 4 and the three phases as well as the rectification which is recorded with a factor of 2.

It is quite conceivable that, with this frequency analysis of the output of the generator, in particular the voltage generated by the generator, not only the angle of articulation can be determined, but also emerging further deviations from the idealized behavior of a shaft, in particular a joint shaft. Wear and/or upcoming failure or faulty behavior of the shaft can thus be detected directly by analyzing the output of the generator.

The solution according to the invention also offers the possibility of determining by frequency analysis of the generator signal a non-uniform angle of articulation at both ends of the joint shaft. In practice, a joint shaft typically has two ends, each of which is attached by way of a cross pin to a center shaft member. These ends are used, for example, for the employment agriculture between the agricultural towing vehicle and the agricultural equipment for imparting a drive torque. Non-uniform angles of articulation at these two ends relative to the center shaft member can be determined by frequency analysis. A sideband in the amplitude spectrum is there used to draw conclusions about non-uniform angles of articulation at both ends of the joint shaft. The analysis can be used as a control variable for changing the position of the joint shaft between the agricultural towing vehicle and the agricultural equipment in order to correct the detected misalignment.

FIG. 8 shows an embodiment of a generator of the present invention in a longitudinal sectional view.

A shaft 12 is mounted rotatable by way of a bearing 13 in a housing 10. The shaft 12 via arms 14 carries a mass 15 formed having a ring segment shape.

The housing 10 comprises tapped bores 16 that open to the outer circumference of the otherwise rotationally symmetrically housing 10 and in which grub screws can be inserted in order to insert the housing 10 into a shaft tube and to attached it in a rotationally fixed manner thereto. The shaft 12 projects over the housing 10 on both sides. A free end of the shaft 12 is attached to a coupling 17 which couples an input shaft of an alternating current generator 18 to the shaft 12 of the rotary generator. The torque of the mass 15 is thus transmitted to the alternating current generator 18.

Provided at the end side of the alternating current generator 18 is an attachment flange 19. The generator presently shown and provided with reference numeral 20 can be inserted into a tubular shaft member in a rotationally fixed manner. The alternating current generator 18 is separately attached to the shaft member in a rotationally fixed manner by way of the flange 19.

LIST OF REFERENCE NUMERALS 1 first shaft member
2 second shaft member
3 cross pin
4 pin
5 pin
6 forks
11 housing
12 shaft
13 bearing
14 arms
15 mass
16 tapped bore
17 coupling
18 alternating current generator
19 flange
20 generator
100 sensor
101 logic
102 transmitter
$\alpha_1$ angle of rotation
$\alpha_2$ angle of rotation
β angle of articulation
$M_1$ torque
$M_2$ torque
$\omega_1$ angular velocity
$\omega_2$ angular velocity

The invention claimed is:
1. A joint shaft, comprising:
at least one cross pin, the at least one cross pin comprising oppositely disposed pins on each of which a hollow rotatable shaft member is attached; and
a generator comprising a housing, the generator being integrated inside the rotatable shaft member in a rota- tionally fixed manner, located on the driven side of a single universal joint or in the intermediate rotatable shaft member of a universal joint shaft comprising at least two universal joints.

2. The joint shaft according to claim 1, further comprising a sensor energized by said generator and attached to said joint shaft.

3. The joint shaft according to claim 2, wherein said sensor is mounted on the cross pin of the joint shaft.

4. The joint shaft according to claim 1, further comprising a logic configured to evaluate an electrical output of said generator.

5. The joint shaft according to claim 4, wherein said logic is configured to evaluate a voltage generated by said generator in order to determine a cardan effect.

6. The joint shaft according to claim 4, wherein said logic is configured to evaluate a voltage generated by said generator in order to determine an angular position between said two shaft members.

7. The joint shaft according to claim 4, wherein said logic is configured to evaluate the electrical output of said generator in order to detect malfunctions of said joint shaft and/or of said generator.

8. The joint shaft according to claim 4, wherein said logic is configured to evaluate the electrical output of said generator in order to determine an operating behavior of a turning shaft.

9. The joint shaft according to claim 8, wherein said logic is configured to determine a rotational speed of the turning shaft.

10. The joint shaft according to claim 1, wherein said generator is configured to energize a transmitter.

11. The joint shaft according to claim 10, wherein said transmitter is configured to send a measuring signal of a sensor connected to said joint shaft to an external logic and/or an evaluation signal generated by a logic of the joint shaft.

12. The joint shaft according to claim 1, wherein the shaft member accommodating the generator comprises a tube member or is formed as a tube.

13. The joint shaft according to claim 1, wherein the generator comprises a shaft that carries a mass on an arm, and a housing that carries the shaft and accommodates the mass.

14. A joint shaft, comprising:
at least one cross pin, the at least one cross pin comprising oppositely disposed pins on each of which a hollow rotatable shaft member is attached; and
at least one generator accommodated by the rotatable shaft member located on the driven side of a single universal joint or by the intermediate rotatable shaft member of a universal joint shaft comprising at least two universal joints,
wherein the at least one generator comprises a housing having fastening elements for an arrangement of the generator being inside of the rotatable shaft member.

15. A joint shaft, comprising
at least one cross pin, the at least one cross pin comprising oppositely disposed pins on each of which a hollow rotatable shaft member is attached; and
a generator comprising a housing provided concentrically inside within the shaft member located on the driven side of a single universal joint or within the intermediate rotatable shaft member of a universal joint shaft comprising at least two universal joints.

\* \* \* \* \*

UNITED STATES PATENT AND TRADEMARK OFFICE
CERTIFICATE OF CORRECTION

| | |
|---|---|
| PATENT NO. | : 11,632,014 B2 |
| APPLICATION NO. | : 16/899799 |
| DATED | : April 18, 2023 |
| INVENTOR(S) | : Timur Mehmet Kisla et al. |

It is certified that error appears in the above-identified patent and that said Letters Patent is hereby corrected as shown below:

In the Claims

Column 8, Line 30, Claim 15, after "inside" delete "within"

Signed and Sealed this
Twentieth Day of June, 2023

Katherine Kelly Vidal
*Director of the United States Patent and Trademark Office*